(12) United States Patent
Slovacek

(10) Patent No.: US 9,479,642 B2
(45) Date of Patent: Oct. 25, 2016

(54) ENHANCED QUALITY MONITORING

(71) Applicant: ZOOM INTERNATIONAL s.r.o., Prague (CZ)

(72) Inventor: Vaclav Slovacek, Prague (CZ)

(73) Assignee: ZOOM INTERNATIONAL s.r.o., Prague (CZ)

( * ) Notice: Subject to any disclaimer, the term of this patent is extended or adjusted under 35 U.S.C. 154(b) by 0 days.

(21) Appl. No.: 14/286,416

(22) Filed: May 23, 2014

(65) Prior Publication Data

US 2014/0254787 A1    Sep. 11, 2014

Related U.S. Application Data

(63) Continuation-in-part of application No. 13/620,715, filed on Sep. 15, 2012, now Pat. No. 8,588,111, and a continuation-in-part of application No. 13/359,484, filed on Jan. 26, 2012, now Pat. No. 9,215,266.

(60) Provisional application No. 61/969,267, filed on Mar. 24, 2014.

(51) Int. Cl.
*H04M 3/51* (2006.01)
*H04M 3/42* (2006.01)

(52) U.S. Cl.
CPC ....... *H04M 3/5175* (2013.01); *H04M 3/42221* (2013.01); *H04M 2203/401* (2013.01)

(58) Field of Classification Search
CPC ................. H04M 2203/401; H04M 3/42221; H04M 3/436
USPC .......... 379/67.1, 88.01–88.03, 92.01, 93.18, 379/93.34, 406.03, 907, 265.01–266.1, 379/88.08; 370/259; 704/200, 235
See application file for complete search history.

(56) References Cited

U.S. PATENT DOCUMENTS

| | | | |
|---|---|---|---|
| 6,724,887 B1 | 4/2004 | Eilbacher et al. | |
| 7,577,246 B2 | 8/2009 | Idan et al. | |
| 7,801,055 B1 | 9/2010 | Blair | |
| 8,094,803 B2* | 1/2012 | Danson et al. | 379/265.02 |
| 8,787,532 B1* | 7/2014 | Adam | H04M 3/5175 379/67.1 |
| 2004/0083101 A1* | 4/2004 | Brown | G10L 15/26 704/235 |
| 2008/0201143 A1* | 8/2008 | Olligschlaeger et al. | 704/235 |
| 2012/0173229 A1* | 7/2012 | Peterson | 704/200 |
| 2015/0092930 A1* | 4/2015 | Mullen | H04M 3/4936 379/88.01 |

OTHER PUBLICATIONS

U.S. Appl. No. 11/457,632, filed Jul. 2006, Brown et al.*
U.S. Appl. No. 11/131,843, filed Jul. 2006, Brown et al.*

* cited by examiner

*Primary Examiner* — MD S Elahee
(74) *Attorney, Agent, or Firm* — Galvin Patent Law LLC; Brian R. Galvin

(57) ABSTRACT

A system for enhanced quality monitoring, comprising a call record server operating on a network-connected computing device, a quality monitoring analysis server operating on a network-connected computing device that receives and analyzes call records from the call record server, a quality monitoring database that stores analysis results, and a monitoring station operating on a network-connected computing device that allows a human user to monitor call records, and a method for enhancing quality monitoring.

2 Claims, 8 Drawing Sheets

ENHANCED QUALITY MONITORING

CROSS-REFERENCE TO RELATED APPLICATIONS

This application is a continuation-in-part of U.S. patent application Ser. No. 13/620,715, titled "SYSTEM AND METHOD FOR PASSIVE COMMUNICATION RECORDING", filed on Sep. 15, 2012, and is a continuation-in-part of U.S. patent application Ser. No. 13/359,484, titled "SYSTEM AND METHOD FOR ZERO-FOOTPRINT SCREEN CAPTURE", filed on Jan. 26, 2012, the entire specifications of each of which are incorporated herein by reference in their entirety. This application claims priority to U.S. provisional patent application Ser. No. 61/969,267, titled "ENHANCED QUALITY MONITORING", which was filed on Mar. 24, 2014, the entire specification of which is incorporated herein by reference.

BACKGROUND OF THE INVENTION

1. Field of the Art

The disclosure relates to the field of quality analysis, and more particularly to the field of audio call quality monitoring.

2. Discussion of the State of the Art

In the field of telecommunications, particularly in contact centers, calls are frequently recorded and reviewed for such purposes as monitoring center operations, customer needs, or for reviewing contact center agent performance. These call recordings are generally reviewed one at a time by trained quality monitoring analysts, who are trained to recognize various customer and agent behaviors and call characteristics and are responsible for providing agents with scoring information or feedback on performance.

The traditional approach generally involves an analyst listening to a call and taking notes throughout, such as verifying whether behavior requirements were met by the agent, or recording the customer's reason for calling. Such an approach is labor-intensive and error-prone, such as missing critical parts of a conversation due to noise in a recording, or any of a number of problems that might be caused by simple human error on the part of the analyst. Furthermore, any information regarding a call must be determined while listening to the recording and performing the review, introducing the possibility of further errors and potentially distracting analysts from the content of a recording while they focus on other information.

Furthermore, analysts are generally prevented from taking immediate action pertaining to a review, instead simply recording their results and submitting them to be utilized later for agent feedback or coaching.

What is needed, is a means to provide call information to an analyst in a concise and easy-to-digest manner before and during a review so that they may focus more on the call itself with basic information already provided, and to provide analysts with a means to communicate with the agent or other individuals immediately, even during a review operation.

SUMMARY OF THE INVENTION

Accordingly, the inventor has conceived and reduced to practice, in a preferred embodiment of the invention, a system and method for enhanced call quality monitoring.

According to a preferred embodiment of the invention, a system for enhanced quality monitoring is disclosed, comprising a call record server that operates on a network-connected computing device, a quality monitoring analytics server that operates on a network-connected computing device, a monitoring interface that operates on a network-connected computing device and accepts user interaction, and an agent communications interface that operates on a network-connected computing device. The QM analytics server receives records from the recording server and processes them to extract and optionally infer metadata such as record date and time, detailed information regarding an agent or agents involved in a recording (such as agent ID, name, prior training, previous quality review scores, or any other information that may be potentially relevant to an analyst performing a review of an agent's performance), call qualities such as number of participants or topic of a call, audio qualities such as an amplitude waveform or voice analytics (such as to determine tone or cadence of a speaker, or vocabulary used, such as to monitor an agent for use of forbidden words or phrases), or any other such information that may be associated with or inferred from a recording. The QM analytics server may then store this information, optionally along with a copy of a recording, in a QM analytics database, for future retrieval and use (such as for further analytics or for presentation to a monitoring analyst via a monitoring station). A monitoring station may present enhanced QM data to an analyst, such as displaying a recording and any metadata associated with it (such as that stored by a QM analytics server) for viewing and further analysis, such as to review a call and score an agent's performance while having more detailed and additional data available.

According to another embodiment of the invention, a method for enhanced quality monitoring, comprising the steps of retrieving a call record, analyzing the call record, storing the call record and the results of analysis, and presenting the call record for review, is disclosed. According to the embodiment, analysis of a call record may be performed to extract and infer additional information related to a call record or its participants, and this data may then be stored and presented to an analyst for enhanced quality monitoring. Additionally, in another embodiment the method may further comprise the additional steps of receiving analyst feedback or other communication and providing this communication to a communication server for handling, such as to send a notification via email or other communication method to an agent, or to schedule an interaction with an agent or another analyst, or any other potential communication that might be desired by an analyst during or as a result of viewing a recording.

According to another embodiment of the invention, a graphical user interface for enhanced quality monitoring comprising an interactive record display, detailed agent information display, and interactive communication means, is disclosed. According to the embodiment, a dynamic and interactive record display may be presented, displaying various attributes or elements of a record being reviewed such as an audio waveform (that may be configurable to represent different audio properties of a call), an event timeline (such as might display specific events that occurred during a call, such as a completed sale, a submitted tech support request, or a quality assessment notation such as a positive or negative performance score impact), or participant information such as caller details or number of participants and any changes that may have occurred during an interaction (for example, if a call was transferred or conferenced). Further according to the embodiment, a detailed agent display may present known information regarding an agent being monitored, for example their personal details (such as name, age, scheduled working routine, or other personal details potentially relevant to an employer or analyst), any skills or training they may have received, contact means such as an email address or direct telephone number to reach the agent (such as if immediate coaching is required), or historical assessment information (such as previously recorded performance evaluations for similar interactions, or evaluations within a specified timeframe). Further according to the embodiment, interactive communication means may be presented, such as to contact another analyst (for example to get a second opinion on a potential issue with an interaction, or to get authorization prior to taking action), or to contact an agent being scored (such as if immediate coaching is required). Such communication means may be automatically configured based at least in part on any known communication methods presented in a detailed agent display, such as incorporating an agent's known personal telephone number for contacting them outside of their scheduled working hours.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
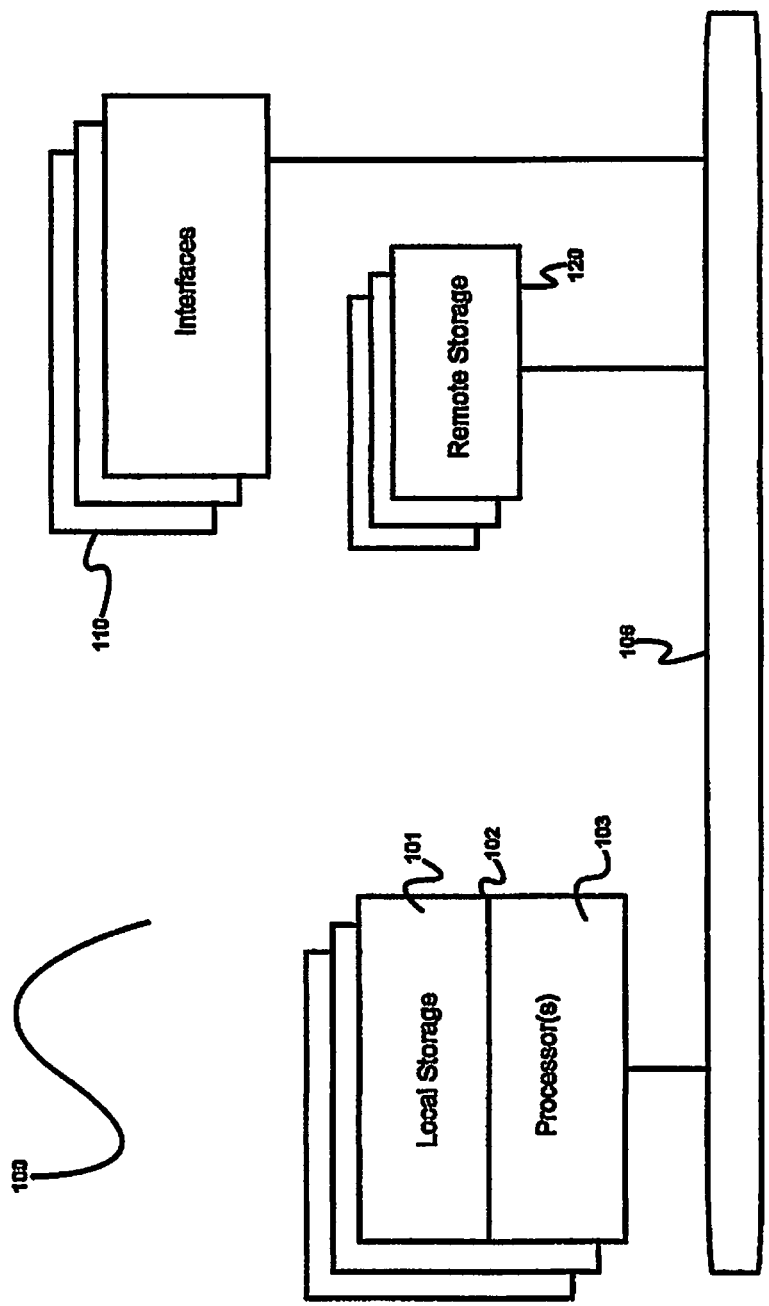
FIG. 1 is a block diagram illustrating an exemplary hardware architecture of a computing device used in an embodiment of the invention.

The inventor has conceived, and reduced to practice, a system and method for enhanced call quality monitoring.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
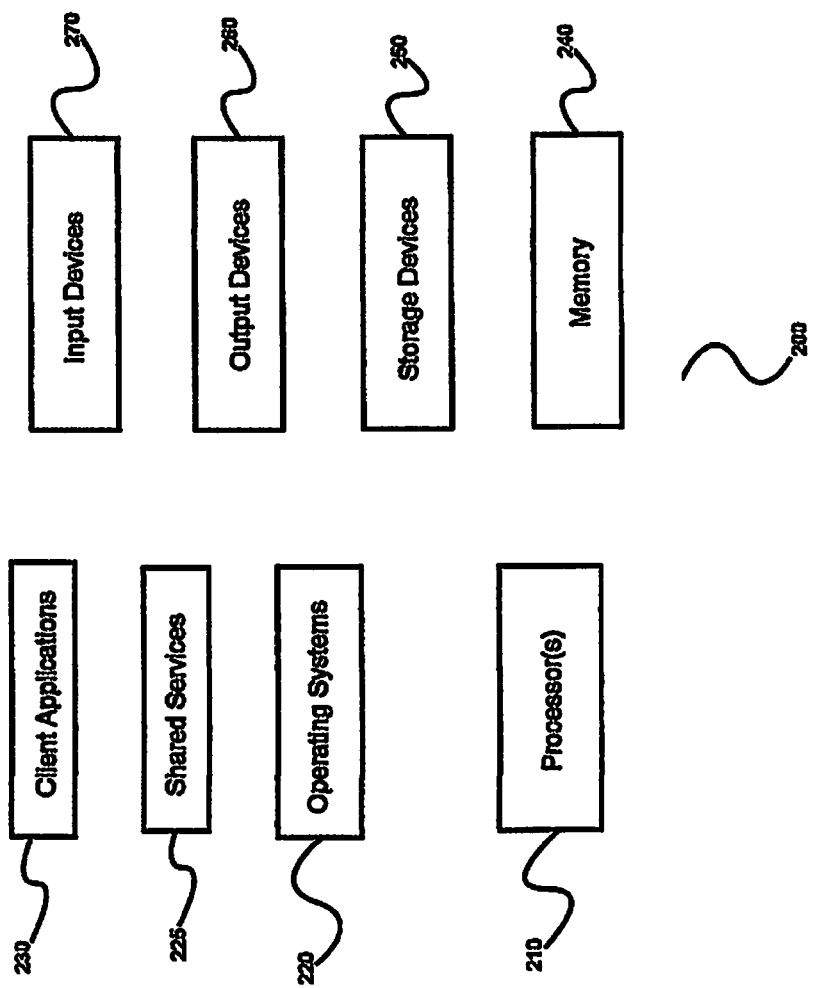
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
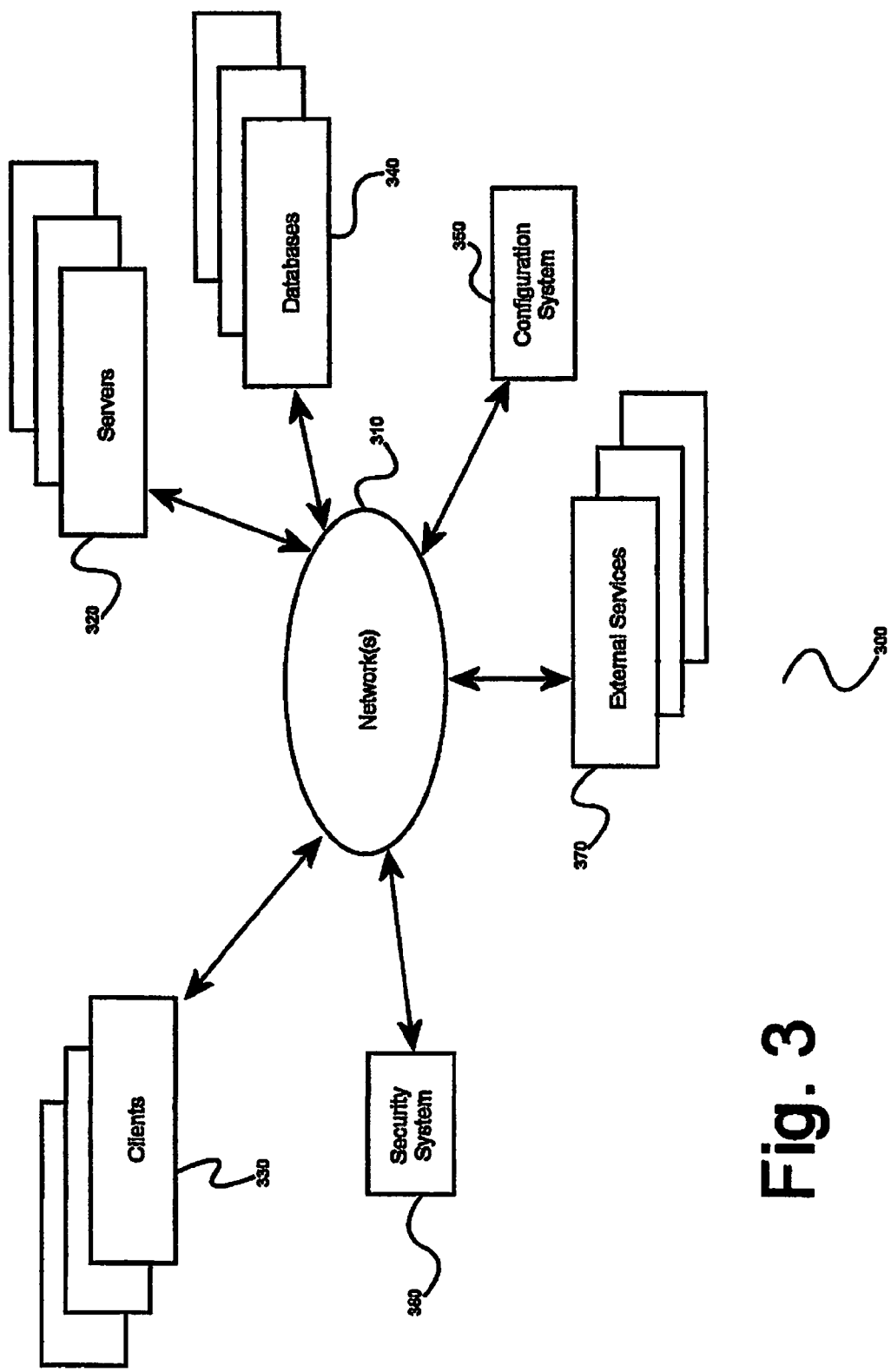
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
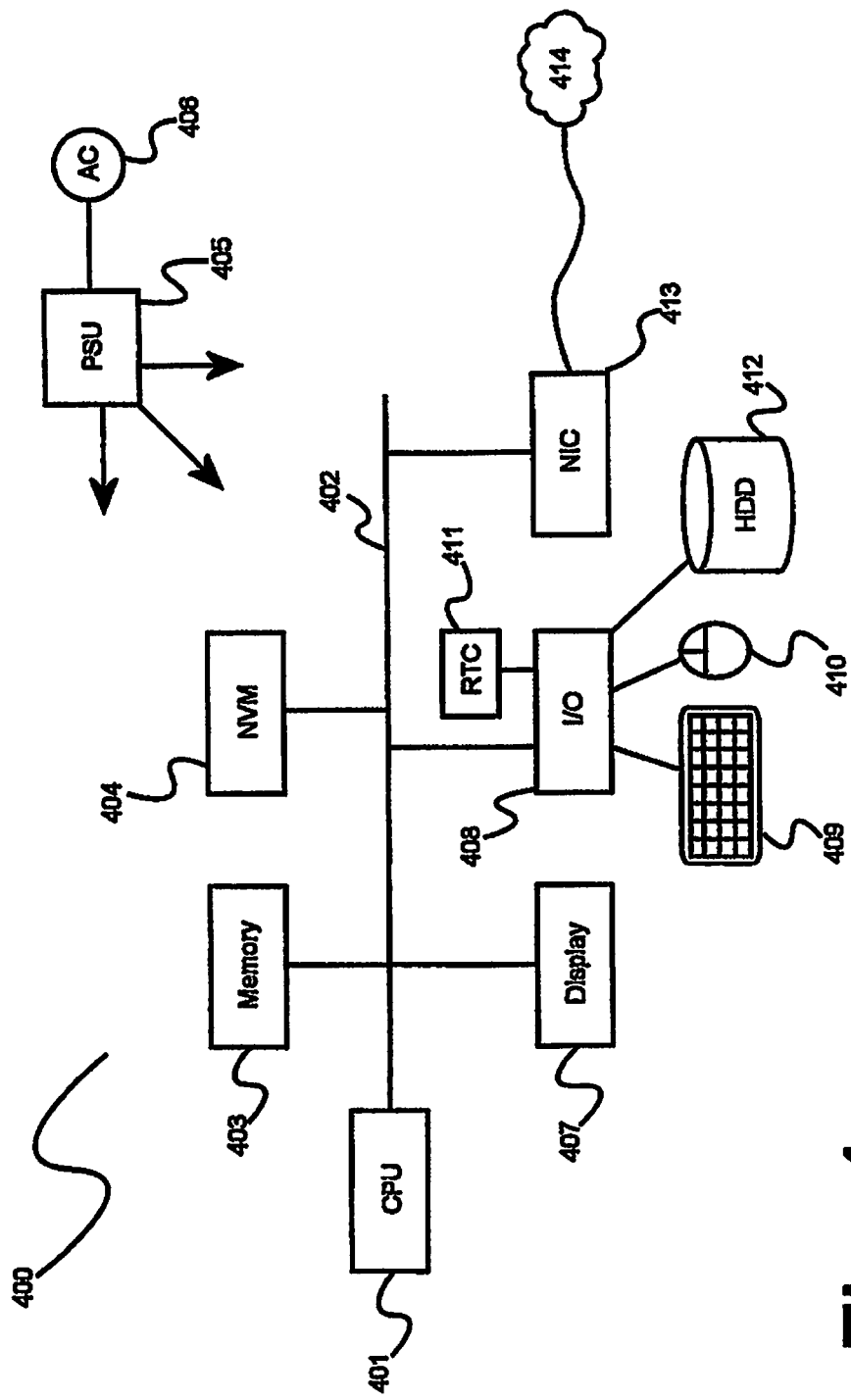
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
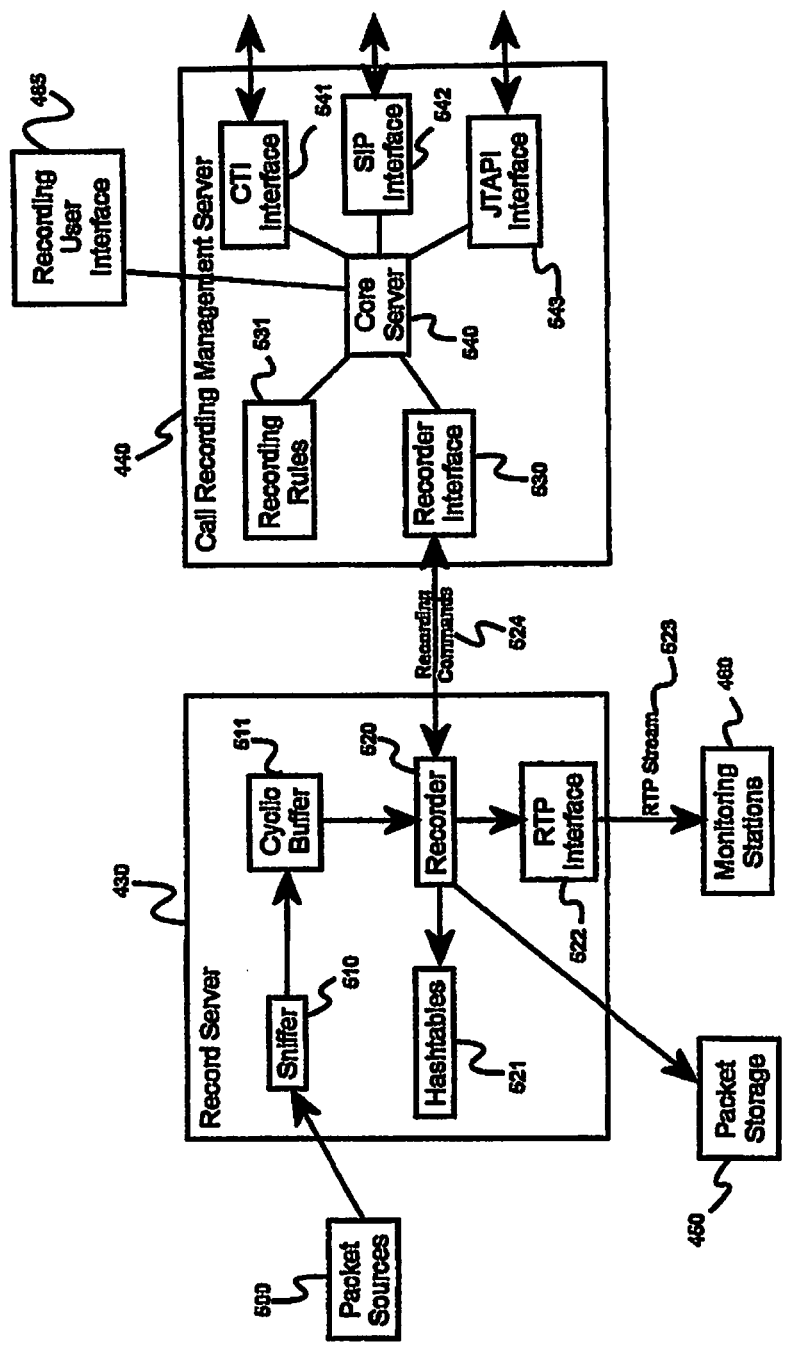
FIG. 5 is a block diagram showing details of call recording management and call recording servers.

FIG. 5 is a block diagram showing details of call recording management and call recording servers. Recording management server 440 is configured to select the communications that are to be recorded in communication environment 400. Core server 540 receives notification from CTI interface 541 that communications for a particular target (for example, all communication packets destined for a specific IP address and port from a specific source IP address and port) as selected by contact center agent selection function known in the art, are to be recorded (herein, referred to as "recording target"). Core server 540 then notifies recorder interface 530 to instruct record server 430 to record communications for the recording target. When recorder 520 receives the recording target's identification information, in this example, a destination IP address and port number, a hash key that corresponds to the identification information for this target, is created in a first hash table (herein, referred to as "hash table one") in hashtables 521.

In a similar process, Core server 540 receives a notification from SIP interface 542 that communications for a particular target (for example, all communication packets that arrive from a specific source IP address and port) as selected by contact center agent selection function known in the art, are to be recorded (herein, also referred to as "recording target"). Core server 540 then notifies recorder interface 530 to instruct record server 430 to record communications for the recording target. When recorder 520 receives the recording target's identification information, in this example a destination IP address and port number, a hash key that corresponds to the identification information for this target, is created in a second hash table (herein, referred to as "hash table two") in hashtables 521.

In a similar process, Core server 540 receives notification from JTAPI interface 543 that communications for a particular target (for example, all communication packets destined for a specific IP address and port) as selected by contact center agent selection function known in the art, are to be recorded (herein, also referred to as "recording target"). Core server 540 then notifies recorder interface 530 to instruct record server 430 to record communications for the recording target. When recorder 520 receives the recording target information, a hash key that corresponds to the identification information for this target, is created in a third hash table (herein, referred to as "hash table three") in hashtables 521.

Referring again to FIG. 5, in the typical operation of the system, packets will be moving through the system from a source to a destination. While in a network router, or other IP networking peripheral, the packets will arrive at packet source 500 (for example a SPAN port, IP tap, or another packet mirroring port known in the art). Sniffer 510 then captures the packets from packet source 500 and passes the packet to cyclic buffer 511. When a packet is received in cyclic buffer 511, recorder 520 is notified. Recorder 520 then analyzes the packet contents and compares the information to the hash tables in hashtables 521. If the identification information (for example, destination IP address, destination port, source IP address, and source port) match an entry in hash table one of hashtables 521 that corresponds to the identification information for this recording target, the system keeps the packet for further processing (herein, referred to as "packet of interest"). Otherwise, if the identification information of the packet does not correspond to any entries in hash table one of hashtables 521, a new set of identification information is set (for example, destination IP address and destination port) and compared to the entries in hash table two of hashtables 521. If the identification information (for example, destination IP address and destination port) match an entry in hash table two of hashtables 521 that corresponds to the identification information for this recording target, the system keeps the packet for further processing (herein, referred to as "packet of interest"). Otherwise, if the identification information of the packet does not correspond to any entries in hash table two of hashtables 521, a new set of identification information is set (for example, the source IP address and source port) and compared to the entries in hash table three of hashtables 521. If the identification information (for example, source IP address and source port) match an entry in hash table three of hashtables 521 that corresponds to the identification information for this recording target, the system keeps the packet for further processing (herein, referred to as "packet of interest"). Otherwise, if the identification information of the packet does not correspond to an entry in hash table three nor any of the other hash tables, the packet is discarded.

Once a packet of interest is identified in cyclic buffer 511 by recorder 520 as outlined above, the packet is copied to packet storage 450 using a standard packet capture library (for example, PCAP, WinCAP, or another packet capture function available in the art). If a request to monitor a recording target is requested by recording user interface 465, then core server 540 sends a request through recorder interface 530 to recorder 520 to pass all the corresponding packets of interest to RTP interface 522. RTP interface 522 forwards RTP stream 523 (that is, the payload component of an IP communication) to monitoring station 460 for the communication to be monitored.

Figure 6:
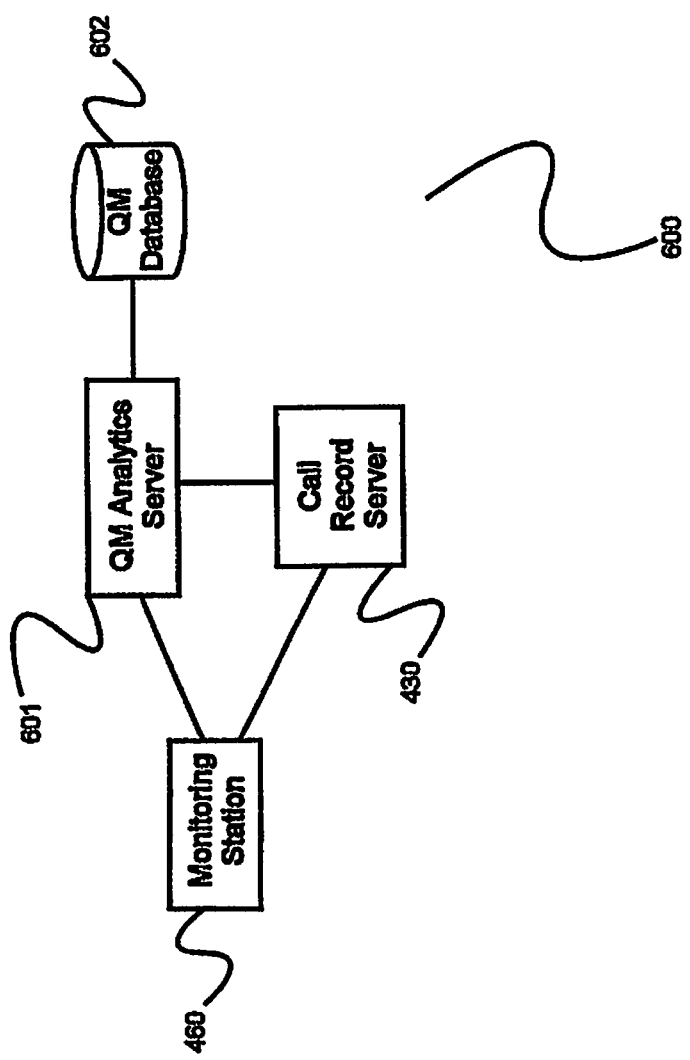
FIG. 6 is a block diagram of an exemplary system architecture for enhanced quality monitoring, according to a preferred embodiment of the invention.

FIG. 6 is a block diagram of an exemplary system architecture 600 for facilitating enhanced quality monitoring, according to a preferred embodiment of the invention. According to the embodiment, a call record server 430 may be connected to a quality monitoring analytics server 601, such as to provide call records for analytics operations. Call records may be provided automatically, such as routine or scheduled quality monitoring, or may be actively requested, such as by an analyst selecting a call for review (either specifically or according to specified criteria, such as a time period or an agent ID). Additionally, calls may be automatically selected and requested by a QM analytics server based on known criteria or rules, such as periodically selecting calls according to a schedule or selecting calls based on previously-stored quality review results (for example, selecting additional calls from an agent that recently received a negative evaluation, or selecting additional calls of a particular type based on previous quality reviews).

QM analytics server 601 may perform analytics on call records such as to identify and extract or infer information for use in quality monitoring, such as call qualities (such as date and time, duration, audio quality, or other qualities of a call itself), participant information (such as number of participants, apparent information such as gender or age, or other participant details), audio properties (such as voice tone or vocal intensity, loudness, pace or cadence, vocabulary, or other audio qualities), or any other such information that may be potentially useful for quality monitoring. QM analytics server 601 may then associate any new information with a call record as metadata, to be optionally stored in a QM database 602 (optionally with a new copy of a call record for faster retrieval by a QM analytics server when needed) or immediately presented to a monitoring station 460 for review by an analyst. In this manner it can be appreciated that analytics may be performed on call records and the results stored for future use (such as may be useful for batch operations, or analyzing a number of calls for immediate review when desired, without having to perform analytics at that time), or it may be performed "live", on a call record that is being requested by an analyst for enhanced quality monitoring, such as when an analyst may wish to score a recent call that has not been analyzed, or to score a call not otherwise selected for review (such as to review a "control" record for QA calibration purposes).

A further use of a QM analytics server 601 may be that of analyzing not only call records, but also review operations performed. For example, analysis might reveal that a particular quality analyst has a tendency to focus on particular call attributes, such as an agent's tone of voice, while ignoring others, such as an agent's adherence to a call script. In such instances, an analytics server 601 may optionally provide additional metadata pertaining to call record attributes, such as making attributes more apparent if they have a history of being overlooked (for example, highlighting an introduction portion of a call record to indicate that it requires attention). An additional use of such trend observation pertaining to analysts, might be to determine when an analyst should perform a QA calibration (as are common in the art), to ensure they continue to score agents accurately. For example, if an analyst has reviewed similar calls recently but provided largely different results (such as ignoring certain characteristics of one call, but focusing on them in another, or continually ignoring characteristics that should be considered important and scored strictly), they (or other quality personnel, such as their manager or a team lead) might be notified that a calibration is needed, or a calibration might be automatically provided before any new call records may be retrieved for review. In this manner, a QA analytics server 601 may enhance operations in a "bi-directional" manner, both improving the relevance and quality of call records being scored, as well as the relevance and quality of the scoring operations performed and scores being provided.

DETAILED DESCRIPTION OF EXEMPLARY EMBODIMENTS

Figure 7:
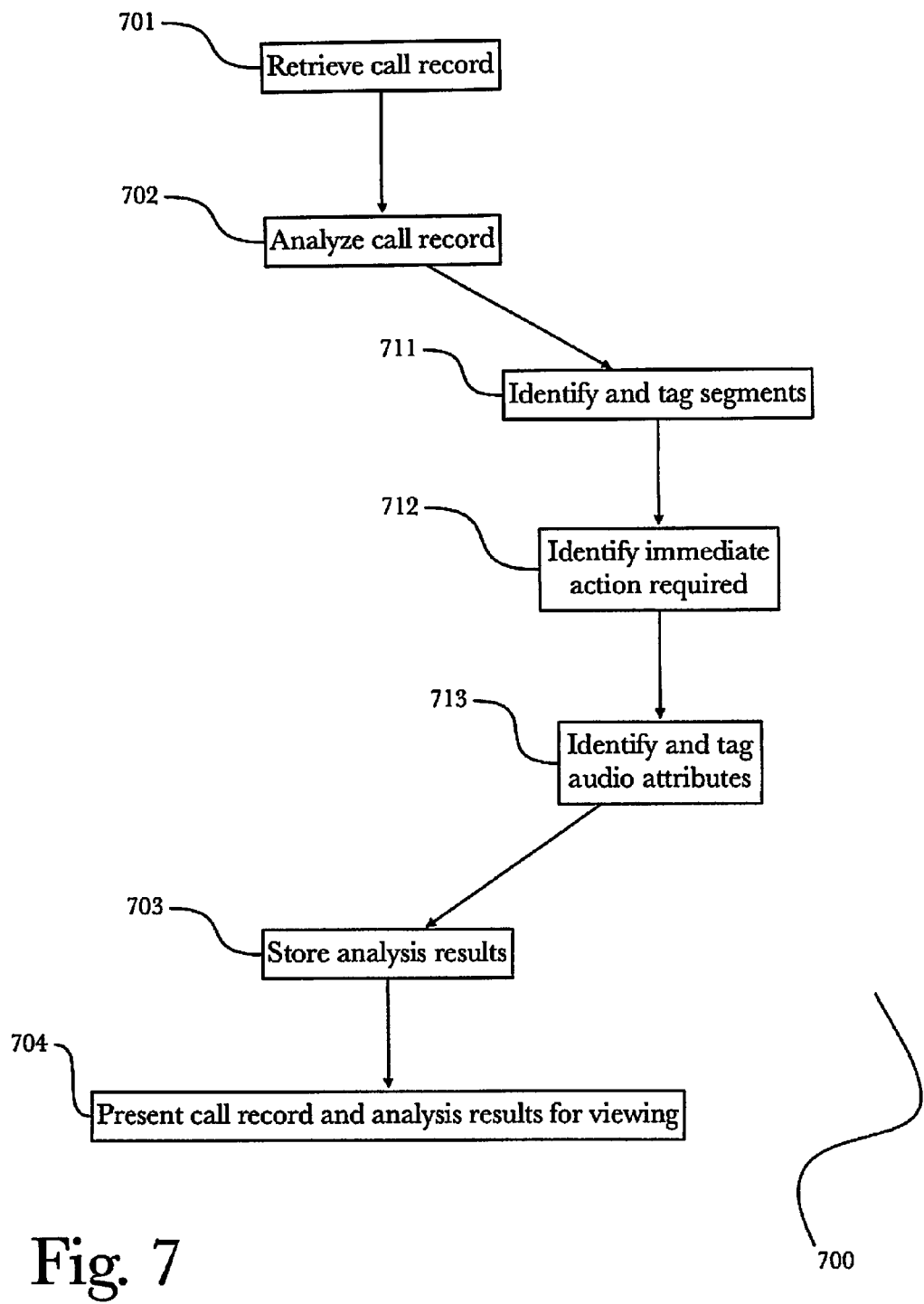
FIG. 7 is a method flow diagram illustrating an exemplary method for enhancing a call record for quality monitoring.

FIG. 7 is a method flow diagram illustrating an exemplary method 700 for enhancing call records for quality monitoring. In an initial step 701, a call record may be retrieved for review, such as by requesting a particular call record or by automatically retrieving a record matching previously-specified criteria (such as scheduled operation, or automatically selecting records matching a particular interaction category or characteristic, such as sales calls). In a next step 702, a call record may be analyzed such as to determine any call metadata that might be helpful for a review operation, for example determining audio characteristics, participant information, or any other information that may be seen as potentially useful for review or analysis. In a first analysis substep 711, segments may be detected or recognized within a call record and the record may be tagged appropriately. In a next substep 712, a particular portion of a call record may be identified as requiring immediate attention, and in a final substep 713 a plurality of audio attributes (such as tone of voice, or speech pace or cadence) may be identified for each of the plurality of call segments or stages, and the call record may be tagged accordingly to identify these attributes. In a next step 703, analysis results (such as any metadata extracted or inferred) may be stored for future use, optionally along with a copy of the call record (such as to explicitly store call records with their metadata, or to store a second copy of a call record with embedded metadata after analysis while leaving the original record unaltered). In a next step 704, a call record may be presented for review, and any associated or embedded metadata may be presented for use in review operations.

Figure 8:
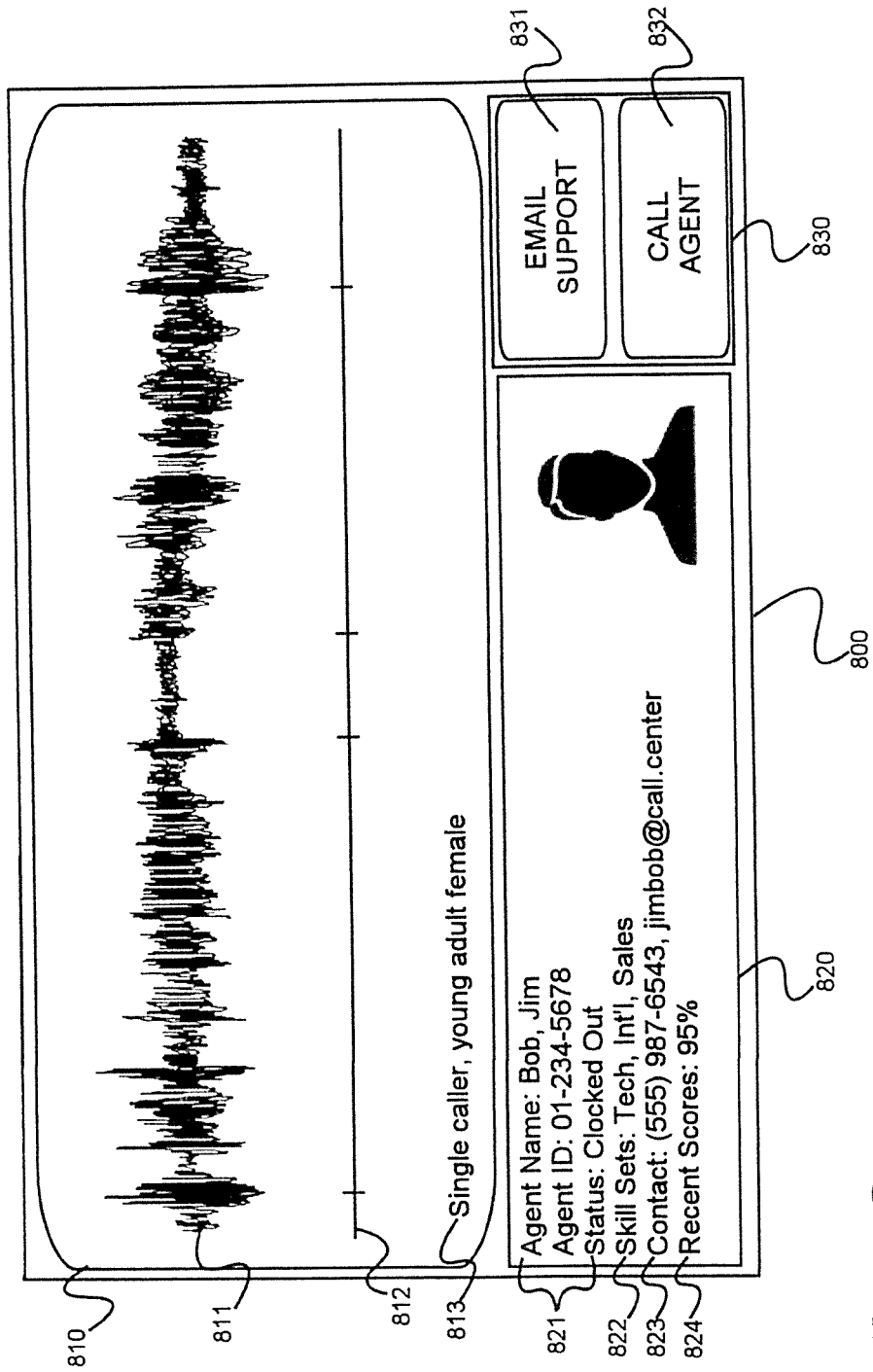
FIG. 8 is an illustration of an exemplary quality monitoring user interface.

FIG. 8 is an illustration of an exemplary user interface 800 for a quality analyst to perform enhanced monitoring operations. As illustrated, a dynamic and interactive record display 810 may be presented, displaying various attributes or elements of a record being reviewed such as an audio waveform 811 (that may be configurable to represent different audio properties of a call), an event timeline 812 (such as might display specific events that occurred during a call, such as a completed sale, a submitted tech support request, or a quality assessment notation such as a positive or negative performance score impact), or participant information 813 such as caller details or number of participants and any changes that may have occurred during an interaction (for example, if a call was transferred or conferenced). Such display elements may be presented simultaneously (as illustrated) for a unified review interface, or optionally may be configured and displayed interchangeably such as to view each display in greater detail or with less "clutter" during a review.

Further according to the embodiment, a detailed agent display 820 may present known information regarding an agent being monitored, for example their personal details 821 (such as name, age, scheduled working routine, or other personal details potentially relevant to an employer or analyst), any skills or training they may have received 822, contact means 823 such as an email address or direct telephone number to reach the agent (such as if immediate coaching is required), or historical assessment information 824 (such as previously recorded performance evaluations for similar interactions, or evaluations within a specified timeframe). As described previously, such information may be presented simultaneously or interchangeably in various combinations, according to a particular review operation.

Further according to the embodiment, interactive communication means 830 may be presented, such as to contact another analyst 831 (for example to get a second opinion on a potential issue with an interaction, or to get authorization prior to taking action), or to contact an agent being scored 832 (such as if immediate coaching is required). Such communication means may be automatically configured based at least in part on any known communication methods presented in a detailed agent display, such as incorporating an agent's known personal telephone number for contacting them outside of their scheduled working hours. Such communication means may be further utilized to schedule future contact with an agent or other individual, such as setting up a scheduled coaching session with the agent under review and additional analysts or management personnel, or scheduling a second review by another analyst (such as to get additional input).

The skilled person will be aware of a range of possible modifications of the various embodiments described above. Accordingly, the present invention is defined by the claims and their equivalents.

What is claimed is:

1. A system for enhanced quality monitoring, comprising:
   a call record server operating on a network-connected computing device;
   a quality monitoring analysis server operating on a network-connected computing device;
   a quality monitoring database operating on a network-connected computing device; and
   a call monitoring software module operating on a monitoring station network-connected computing device comprising at least a video screen and an audio output device;
   wherein the call record server records an audio call and provides a resulting call recording to the quality monitoring analysis server;
   wherein the quality monitoring analysis server analyzes the call recording, the analysis comprising at least the steps of:
      automatically detecting a plurality of call stages and tagging the call recording accordingly;
      measuring a plurality of audio attributes of each of the plurality of call stages and tagging each corresponding portion of the call recording with the plurality of measured audio attributes, the plurality of measured audio attributes including at least vocal intensity and pace of speech; and
      automatically identifying, using the plurality of measured audio attributes, a portion of the call recording that requires particular attention by a human monitor;
   wherein the quality monitoring database stores results of the analysis and the call recording;
   wherein the quality monitoring analysis server determines that a specific call recording requires human monitoring and thereupon sends the call recording and its associated analysis results to the call monitoring software module for review by a human user; and
   wherein the call recording and associated analysis are presented by the call monitoring software via the video screen of the monitoring station visually, the visual presentation comprising at least a visual representation of the audio waveform of the call recording, an indicia of a transition from a first call stage to a second call stage, and an indicia of a call stage that requires particular attention from the human monitor.

2. A method for enhancing quality monitoring, comprising the steps of:
   (a) obtaining a call recording, using a call record server operating on a network-connected computing device;
   (b) analyzing the call recording, using a quality monitoring analysis server operating on a network-connected computing device, the analyzing comprising the sub-steps of:
      automatically detecting a plurality of call stages and tagging the call recording accordingly;
      measuring a plurality of audio attributes of each of the plurality of call stages and tagging each corresponding stage of the call recording with the plurality of measured audio attributes, the measured audio attributes including at least vocal intensity and pace of speech; and
      automatically identifying, using the plurality of measured audio attributes, a portion of the call recording that requires particular attention by a human monitor;
   (c) storing results of the analysis in a quality monitoring database operating on a network-connected computing device; and
   (d) presenting the results of the analysis and the call recording to a human monitor user using call monitoring software stored and operating on a network-connected monitoring station computing device comprising at least a video screen and an audio output device, the visual presentation comprising at least a visual representation of the audio waveform of the call recording, an indicia of a transition from a first call stage to a second call stage, and an indicia of a call stage that requires particular attention from the human monitor.

* * * * *